Oct. 8, 1963 E. A. HILKER 3,106,611
SPECIAL SERVICE CONCENTRATOR SYSTEM
Filed Aug. 24, 1960
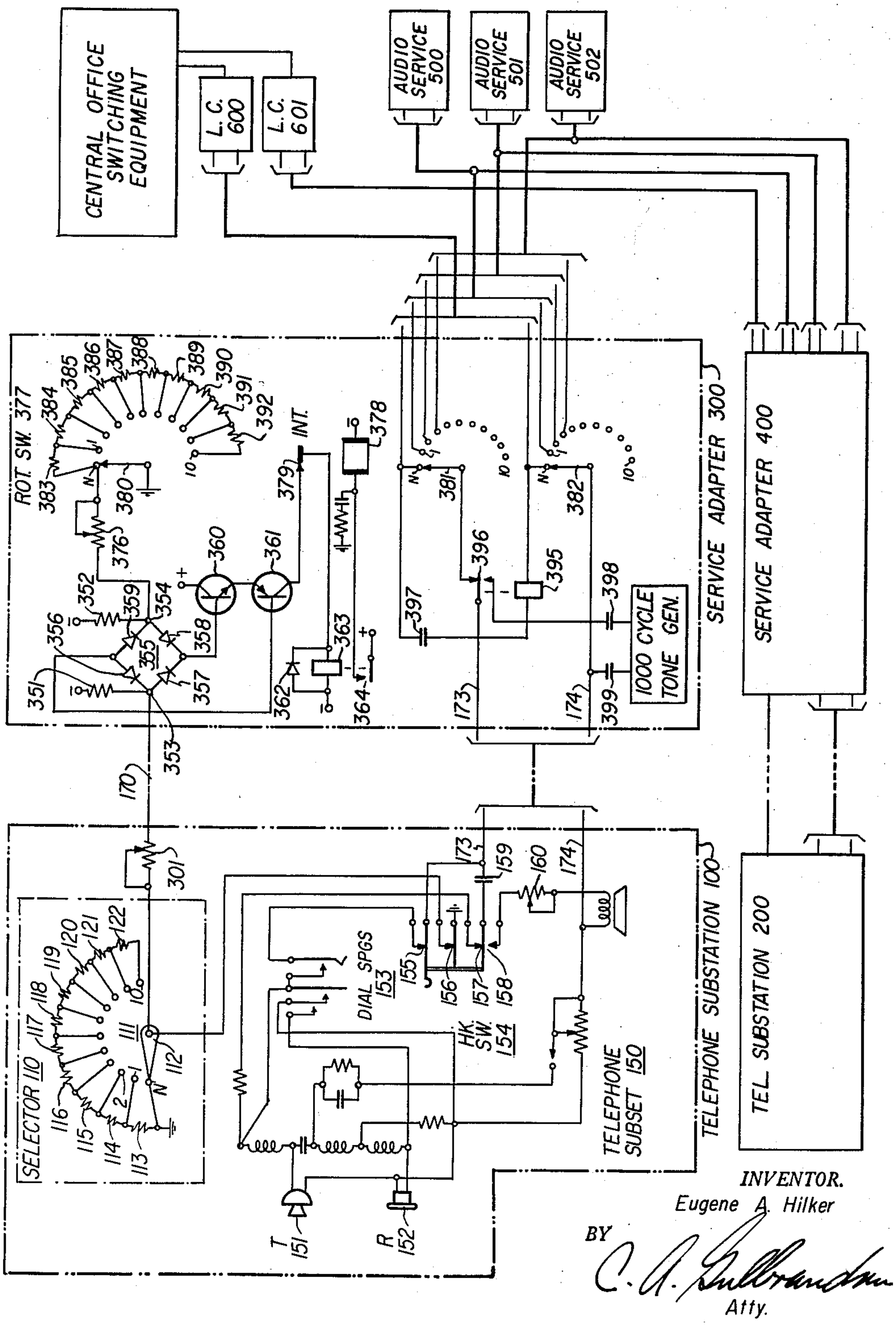
INVENTOR.
Eugene A. Hilker
BY C. A. Gullbrandsen
Atty.

3,106,611
SPECIAL SERVICE CONCENTRATOR SYSTEM

Eugene A. Hilker, Addison, Ill., assignor to Automatic Electric Laboratories, Inc., Northlake, Ill., a corporation of Delaware Filed Aug. 24, 1960, Ser. No. 51,745
4 Claims. (Cl. 179—2)

This invention relates to a special service concentrator system. More particularly, the invention relates to a special service concentrator system applicable for use in, for example, a hotel in conjunction with the telephone equipment thereat to provide different audio services, such as radio programs, message recorders and the like to each of the hotel guests, in addition to the telephone service.

It is an object of this invention to provide a new and improved special service concentrator system for providing a plurality of different audio services.

It is a further object of this invention to provide a new and improved special service concentrator system for providing a plurality of different audio services individually selectable by each of a number of parties.

It is a still further object of this invention to provide a new and improved special service concentrator system wherein both incoming and outgoing telephone calls have priority over the special audio services.

The invention is disclosed as it is embodied in a hotel special service concentrator system, however it is to be understood that the system is not limited to this particular application.

A feature of the present disclosure is the provision of a selector switch, such as a wafer switch, at each of the telephone substations. A party may, without the necessity of removing the telephone handset, select any one of a number of audio services, such as radio programs, message recorders, and the like available merely by setting the wafer switch to the desired position.

A further feature of this disclosure is that the wafer switch is, in addition, connected in parallel with a pair of hookswitch contacts of the telephone subset. The operation of the hookswitch in removing the telephone handset automatically disconnects the audio service from the telephone substation and connects a line circuit for telephone calls to it whereby outgoing telephone calls have priority over these special audio services.

A still further feature of this disclosure is the provision of a relay operated in response to a ringing signal on an incoming telephone call. The relay in operating disconnects the audio service from the telephone substation and connects a 1000-cycle tone signal to the telephone substation to signal the party of an incoming telephone call. The party on answering the call is automatically connected through to the line circuit thus granting incoming telephone calls priority over the special audio services.

A still further feature is the provision of a rotary switch controlled by the wafer switch for selecting any one of the special audio services. A still further feature is that control of the rotary switch to connect the telephone substation to any one of the audio services is effected by means of a single conductor and ground, or a pair of conductors, while an additional pair of conductors is used for a voice communication, including telephone calls, and for tone ringing.

A still further feature of this disclosure is that control of the rotary switch to connect the telephone subset to either a selected one of the audio services or its associated line circuit is by means of two bridge circuits. The selector switch at the telephone substation has a number of resistances connected thereto and forms one variable arm of a Wheatstone bridge. One level of bank contacts of the remotely located rotary switch has a number of resistances connected thereto and forms another variable arm of the bridge while two fixed resistances form the remaining two arms. The rotary switch is caused to step by varying the resistance of the variable arm represented by the selector switch. A diode bridge connected across the output diagonal of the Wheatstone bridge provides a unidirectional signal, resulting from the unbalancing of the bridge, to a transistor amplifier. The amplified output signal operates a relay which, in turn, energizes the motor magnet of the rotary switch causing it to step its wiper. Stepping of the wiper is continued until balance of the bridge circuit is restored, which occurs when the proper selection is made. In this respect, the invention is a further development of the R. E. Stoffels U.S. patent application, Serial No. 41,300, filed July 7, 1960.

The invention, both as to its organization and method of operation, together with other objects and features not specifically mentioned, will best be understood by reference to the following specification taken in connection with the following drawing.

In this drawing the detailed circuitry of the special service concentrator of this invention is shown.

Referring now to the drawing, the system is shown comprising telephone substations 100 and 200 and audio service means 500–502 which may be, for example, radio programs, message recorders or the like. Only the two telephone substations 100 and 200 and audio service means 500–502 are shown for sake of clarity, however it is to be understood that any number of substations and audio service means may be used. Associated with each telephone substation is a service adapter, such as service adapters 300 and 400 associated with telephone substations 100 and 200, respectively. Also, each of the service adapters is connected to each of the audio service means, and, in addition has a line circuit connected thereto, such as line circuits 600 and 601 connected to service adapters 300 and 400, respectively. Each of the telephone substations comprises a telephone subset and a selector such as telephone subset 150 and selector 110.

The operation of the system is such that a party at any one of the telephone substations may select any one of the audio service means simply by operating the selector. The operation of the selector is detected by the service adapter which then operates to connect the telephone subset to the selected one of the audio service means.

The party at any of the telephone substations may place an outgoing telephone call by means of the telephone subset. If the substation is connected to one of the audio service means the operation is such that operating the hookswitch of the telephone subset overrides the selector and causes the service adapter to automatically disconnect the audio service means and to connect the telephone subset through to the associated line circuit. The operation is essentially the same on an incoming telephone call. The incoming ringing signal is detected by the service adapter and the audio service means is automatically disconnected from the audio service, a 1000-cycle tone signal is transmitted to alert the party, and on the operation of the hookswitch of the telephone subset the override on the selector causes the service adapter to automatically connect the subset through to the line circuit. Both incoming and outgoing telephone calls therefore are granted priority over the audio service means.

Referring now to the detailed circuitry. The telephone substation 100, as well as all of the other substations, includes a selector 110 comprising wafer switch 111 having a wiper 112 and a plurality of resistors 113–122 connected to its bank contacts, and a telephone subset 150 including as its principal components a transmitter 151, a receiver 152, dial impulse springs 153, hookswitch 154 having contacts 155–158, a variable resistor 160 and a loudspeaker 161. Associated with each of the telephone substations is a service adapter, such as service adapter 300 associated with telephone substation 100, which comprises 1st and 2nd fixed resistors 351 and 352, a diode bridge 355 including diodes 356–359, a transistor amplifier including complementary transistors 360 and 361, a relay 363 and a rotary switch 377 having a motor magnet 378, three levels of bank contacts including wipers 380–382, respectively, and a plurality of resistors 383–392 connected to the bank contacts on the first level (as shown). A plurality of audio service means 500–502 are connected to all of the service adapters and may be, for example, radio programs, message recorder or the like. In addition, each of the service adapters has a line circuit associated with it, such as line circuit 600 associated with service adapter 300.

The resistors 113–122 associated with wafer switch 111 and the resistors 383–392 connected to the bank contacts of the first level of rotary switch 377 form one leg of a resistance bridge, respectively, while the two fixed resistors 351 and 352 each form another leg of the resistance bridge. By varying the setting of wiper 112 of wafer switch 111 the resistance bridge is unbalanced. Diode bridge 355 is connected across the output diagonal of the resistance bridge and causes the signal resulting from the unbalancing (due to either a higher or lower potential at point 353 than at point 354) of the resistance bridge to flow in a unidirectional rather than a bi-directional manner. The transistor amplifier comprising transistors 360 and 361 is connected across one diagonal of the diode bridge and amplifies this signal. Relay 363 is connected through a mutually interrupting circuit of the motor magnet 378 and is operated when transistors 360 and 361 are rendered conductive by the signal from diode bridge 355. Relay 363 extends power to energize the motor magnet 378, causing it to operate and step wipers 380–382 of the rotary switch 377. As wiper 380 is stepped across the bank contacts one or more of the resistors 383–392 are connected in the other variable leg of the resistance bridge. Wiper 380 is stepped until the resistance of this last-mentioned variable leg corresponds to the resistance of the variable leg represented by the wafer switch 111, at which time the balanced condition of the resistance bridge will be restored and current flow will cease. Transistors 360 and 361 are rendered non-conductive and relay 363 will not operate thus motor magnet 378 remains de-energized.

Audio service means 500–502 are connected to the other two levels of bank contacts on the rotary switch 377, and when wipers 381 and 382 are stepped the audio service means associated with the corresponding contacts are extended through to the telephone subset 150. In addition, the line circuit, for example line circuit 600 associated with service adapter 300, is also connected through the bank contacts of the rotary switch 377 to the telephone subset 150.

It may be observed that the operation of the hookswitch, for example hookswitch 154 of telephone subset 150, shunts out the wiper 112 and the resistance presented by the wafer switch 111, and, in addition places ground on the conductor 170 connected to point 353 of the resistance bridge. With this arrangement priority is granted to outgoing telephone calls. This may be explained as follows: operating hookswitch 154 at make contacts 156 places ground on the wiper 112 and the resistance of wafer switch 11 representing the one variable leg of the resistance bridge is effectively shunted out since there is ground on both sides of wiper 112; the ground placed on conductor 170 causes current to flow from ground through resistors 301 and 351 to battery, this current flow causes the resistance bridge to be unbalanced; transistors 360 and 361 will be rendered conductive due to the signal flow through diode bridge 355; relay 363 will be operated to, in turn, energize motor magnet 378 causing it to step wipers 380–382 of the rotary switch 377; wipers 380–382 will be continually stepped until wiper 380 is stepped to the normal bank contact at which time ground is connected to wiper 380 causing current to flow from ground through resistors 376 and 352 to battery, and since this resistance is equivalent to that of the other variable leg the balanced condition of the resistance bridge will be restored and current flow will cease. It may therefore be observed that regardless of the setting of wiper 112 of the wafer switch 111 operation of the hookswitch 154 causes wipers 380–382 of the rotary switch 377 to be stepped to the normal bank contacts. Line circuit 600 connected to the normal bank contact on the other two levels is then extended by means of the wipers 381 and 382 to the telephone subset 150.

It may be further noted that this control is exercised by means of a single conductor and ground. Rather than using a ground return an additional conductor may be connected between the hookswitch and the normal bank contact on the first level of the rotary switch if it is desired. The variable resistors 301 and 376 are provided to balance the resistance bridge for proper operation of the circuit; that is, resistors 301 and 376 may be adjusted to compensate for the difference in line resistances.

Priority is also granted to incoming telephone calls. For example, it may be noted that relay 395 bridges the bank contacts associated with the line circuit 600 and ring current impressed on the line circuit 600 from an incoming call from the central office, or from a local PABX installation, flows through the relay 395, which is responsive to the alternating-current ringing signal. Relay 395 is operated and at the break-make contacts 396 disconnects the audio service means (by opening the operating path at the break contact of the contacts 396 if an audio service is connected to wiper 381) from the telephone subset and connects the 1000-cycle tone signal through to the telephone subset 150. It may be noted that telephone subset 150, as well as all of the other telephone subsets, has in addition to the normally provided transmitter 151 and receiver 152 a loudspeaker 161. Loudspeaker 161 functions as a transducer for the audio service means as well as for the transmission of the 1000-cycle tone signal on an incoming telephone call. The guest on hearing the 1000-cycle tone signal answers the telephone call by removing the telephone handset which, in turn, operates the hookswitch 154. Hookswitch 154 in operating at the make contacts 156 again shunts out the wiper 112 and the resistance represented by the wafer switch 111 unbalancing the resistance bridge to cause wipers 380–382 of the rotary switch 177 to be stepped to the normal bank contacts in the manner previously described. During the silent interval of the ringing cycle relay 395 will restore switching the telephone subset through to the line circuit, which in turn will cause the telephone call to be switched through in the manner well known in the telephone art.

It may also be noted that at the break contact 158 of hook-switch 154 the loudspeaker is disconnected from the line and at the make contact 157 the line is connected through the telephone subset and the guest may converse by means of the transmitter 151 and receiver 152.

Furthermore, on both incoming and outgoing telephone calls it may be noted that when the handset is replaced in the cradle of the telephone subset on completion of the call hookswitch 154 is restored to normal and to the audio service previously selected is automatically reconnected to the telephone subset. This is true since the shunt on the wiper 112 and the resistance represented by the wafer switch 111 is removed to again unbalance the resistance bridge causing the wipers 380–381 to again be stepped to the corresponding bank contact of the rotary switch 377 in the manner previously described.

*Detailed Description*

Assume now for the purpose of illustrating the detailed operation of the system that the hotel guest at the telephone substation 100 desires to listen to the audio service means 501, which may be, for example, a radio program. To select audio service means 501 the hotel guest sets wiper 112 of switch 111 to its second bank contact. In doing so, current will flow from ground through resistors 113 and 114, the second bank contact and wiper 112, over conductor 170, through resistors 301 and 351 to battery. With resistors 113 and 114 now included in the circuit the resistance of the variable leg of the resistance bridge represented by the resistance of the switch 111 is larger and the potential at the point 353 will be higher than that at the point 354 and the resistance bridge circuit will be unbalanced. A higher potential at point 353 causes current to flow through diode 357, the base and emitter of transistor 360, the emitter and base of transistor 361, and through diode 359. It may be noted that whether the potential at point 353 is higher or lower than that of point 354 (caused by a larger or smaller resistance being included by means of switch 111), the current flow is in the direction as shown by the arrows. When current flows over the above-described path transistors 360 and 361 will be rendered conductive. With transistors 360 and 361 conductive current flows from battery through the collector and emitter of transistor 360, the emitter and collector of transistor 361, through interrupter contact 379, to battery of relay 363, causing it to operate. Relay 363 in operating closes make contact 364 to extend battery to the motor magnet 378 of the rotary switch 377, causing it to operate. This may be traced as follows: battery, make contact 364, through motor magnet 378, to battery. When motor magnet 378 operates wipers 380–382 of the rotary switch 377 are stepped from their normal contacts to the first bank contact on their respective levels. Wiper 380 in stepping to the first bank contact causes current to flow from ground, through wiper 380 and the first bank contact, through resistors 383, 376 and 352, to battery. The resistance of the variable leg represented by switch 111 is still larger than that of the variable leg represented by the resistances associated with the bank contacts of rotary switch 377; thus the resistance bridge will remain unbalanced. Also, when motor magnet 378 operated, at interrupter contact 379 the operating circuit of relay 363 was opened to cause relay 363 to restore, which, in turn, causes motor magnet 378 to be de-energized. When motor magnet 378 restores interrupter contact 379 is again closed, and since the resistance bridge circuit is still unbalanced current will continue to flow through the diode 355 and transistors 360 and 361. Transistors 360 and 361 remain conductive and current continues to flow from battery, through transistors 360 and 361, interrupter contact 379, to battery of relay 363 causing it to again operate. Relay 363 in operating closes make contact 364 which, in turn, causes motor magnet 378 to again operate to step wipers 380–382 to the second bank on their respective levels. When wiper 380 steps to the second bank contact resistors 384 and 383 are now serially connected in the last-mentioned circuit and current will flow from ground, over wiper 380 and the second bank contact, through resistors 384, 383, 376 and 352, to battery. Resistors 384 and 383 correspond in value to the resistors 114 and 113 of switch 111, thus the resistance of the two variable legs of the resistance bridge will now be equal. The balanced condition of the resistance bridge will be restored and the potential at points 353 and 354 will be equal as before. When motor magnet 378 operated, at interrupter contact 379 it interrupted the operate circuit of relay 363 causing it to restore. Relay 363 in restoring also causes motor magnet 378 to be de-energized. Since the potentials at points 353 and 354 are now of the same value current will no longer flow through the diode bridge and transistors 360 and 361; thus transistors 360 and 361 will be rendered non-conductive. When motor magnet 378 restores closing interrupter contact 379 relay 363 will not operate since transistors 360 and 361 are now non-conductive.

It may be noted that the audio service means 501 is connected through to the telephone substation 100 when the wipers 381 and 382 are stepped to the second bank contact on their respective levels. This may be traced as follows: from audio service means 501, to the second bank contact and wiper 381, break contact 396 of relay 395, over conductor 173 to the telephone subset 150, capacitor 159, break contact 158 of the hookswitch 154 (shown in the off-normal position), variable resistor 160, loudspeaker 161, over conductor 174, wiper 382 and the second bank contact of rotary switch 377, to audio service means 501. The output of the audio service means 501 is impressed on the loudspeaker 161 over the above-described path. If the hotel guest at substation 100 desires to select any of the other audio service means, such as for example audio service means 500 or 502, he simply sets wiper 112 of switch 111 to the bank contact associated with the particular audio service means desired. The resistance bridge will again be unbalanced which, in turn, will cause motor magnet 378 to operate and step wipers 380–382 to the bank contacts of the rotary switch 377 corresponding to the selected audio service means. It may be observed that the selection of any one of the many audio service means available is accomplished simply by setting the wiper 112 of switch 111 to the bank contact corresponding to the desired audio service means. Furthermore, it may be noted that control of rotary switch 377 to select one of the audio service means is accomplished over a single conductor between the two remote points and ground. The variable resistors 301 and 376 are provided to adjust for the variable line resistances between the two remote points. To balance the resistance bridge when the system is in its normally unoperated condition, resistors 301 and 376 are simply varied until the resistance bridge is balanced. If a ground return is not desired an additional conductor can be connected from the ground connection at the remote station to the ground connection at wiper 380 of rotary switch 377.

To further illustrate the operation of the system, assume now that the hotel guest at substation 100 is listening to the audio service provided by means of audio service means 501 and that he now desires to place a telephone call, it is not necessary for the hotel guest to set switch 111 to its normally unoperated position. The guest simply removes the handset (not shown) to operate hookswitch 154. Hookswitch 154 in operating, at make contact 156 places ground on both sides of the wiper 112 thereby shunting out the resistance inserted by switch 111 causing the resistance bridge to be again unbalanced in the manner previously described. Current will again flow through the diode rectifier bridge 355 to render transistors 360 and 361 conductive. Transistors 360 and 361 when rendered conductive, in turn, cause relay 363 to operate in the manner previously described. Relay 363 in operating, as before, causes motor magnet 378 to operate to step wipers 380–382 to the normal bank contact on their respective levels. When wiper 380 steps to the normal bank contact the resistance bridge circuit will again be restored to the balanced condition since ground will also be connected through wiper 380 to the point 354 and the potential at points 353 and 354 will be equal. As before, when balance is achieved transistors 360 and 361 will be rendered non-conductive and relay 363 will not operate. It may be observed that the telephone subset 150 at the telephone substation 100 is now connected to line circuit 600 associated with service adapter 300, this may be traced as follows: from the make contact 155 of the hookswitch 154, over conductor 173, break contact 396 of relay 395, wiper 381 and the normal bank contact of the rotary switch 377, to the line circuit 600, and from the line circuit 600 to the first bank contact and wiper 382 of the rotary switch 377, over conductor 174, through the telephone subset to the make contact 155. The line circuit 600 has a telephone line connected thereto extending to the central office and the subscriber may now place his call by actuating his dial (not shown) which causes the dial impulse springs 153 to be actuated to cause the switching equipment in the central office to operate in the well-known manner to select the party called by the hotel guest at the telephone substation 100.

Upon completion of the call the hotel guest at telephone substation 100 replaces his handset which in turn, restores the hookswitch 154 to its normal position operating contacts 155–158. At make contact 156 the shunt on the wiper 112 and the resistance of switch 111 and the ground on conductor 170 is again removed. Wiper 112 of switch 111 was not varied at the time of placing the telephone call so it is still on the second bank contact which corresponds to the selection of the audio service means 501. With wiper 112 in this position and the ground removed from conductor 170 the resistance bridge circuit will again be unbalanced since wiper 380 of the rotary switch 377 is connected to its normal bank contact grounding the variable leg of the resistance bridge represented by the rotary switch 377. Current will again flow in the diode bridge 355 as previously described and transistors 360 and 361 will be rendered conductive. When transistors 360 and 361 are conductive relay 363 is again operated to extend battery to the motor magnet 378 causing it to operate and step wipers 380–382 to the next bank contact. The motor magnet 378 and relay 363 are alternately operated and restored to step wipers 380–382 and when wiper 380 steps to the second bank contact resistors 384 and 383 are again inserted in this variable leg of the resistance bridge and balance will again be restored. When balance is restored transistors 360 and 361 are again rendered non-conductive and relay 363 will not operate. It may therefore be observed that the hotel guest at the telephone substation 100 on placing a telephone call has priority over any audio service means to which it may be connected and that, in addition, on completion of the telephone call, when the handset is restored to operate the hookswitch 154, the audio service means to which it was previously connected is automatically re-connected to the telephone substation 100.

As a further example of the operation of the system, assume that the telephone substation 100 is connected to the audio service means 501 as previously described, and that the hotel guest at the telephone substation 100 receives an incoming telephone call from the central office. When line circuit 600 is seized by the incoming call from the central office the ringing current extended over the telephone line from the central office is extended to the line circuit 600, to the normal bank contact on the second level of bank contacts, through capacitor 397, relay 395, to the normal bank contact on the third level of bank contacts, to the line circuit 600. The ringing signal impressed on relay 395 causes it to operate. Relay 395 in operating at the break contact of break-make contacts 396 disconnects the output of the audio service means 501 from the telephone subset 150 and at the make contact connects a 1,000 cycle tone signal to the input of the telephone subset 150. This may be traced as follows: from the 1,000 cycle tone supply, through capacitor 398, the make contact of break-make contacts 396, over conductor 173, to the telephone subset 150, capacitor 159, break contact 158 of hookswitch 154 (shown in its off-normal position), variable resistor 160, through loudspeaker 161, over conductor 174, through capacitor 399, to the 1,000 cycle tone supply. The 1,000 cycle tone signal impressed on the loudspeaker 161 at the telephone subset 100 alerts the subscriber that he has an incoming telephone call. The subscriber on removing the handset operates hookswitch 154. When hookswitch 154 is operated it may be noted that at make contact 156 the wiper 112 and the resistance of switch 111 is shunted and the ground is again connected to conductor 170 causing the resistance bridge circuit to be unbalanced as previously described. Wipers 380–382 of the rotary switch 377 are again caused to step in the manner previously described until wiper 380 steps to the normal bank contact to extend or connect ground to the other variable leg of the resistance bridge to restore the resistance bridge to a balanced condition. Transistors 360 and 361 are rendered non-conductive thereby rendering relay 363 inoperative. It may also be noted that at break contact 158 of hookswitch 154 the 1,000 cycle tone signal impressed on the loudspeaker 161 is disconnected. Wipers 381 and 382 are also sitting on the normal bank contact of the respective levels of the rotary switch 377. During the silent interval of the ringing period relay 395 will restore and the incoming telephone call will be extended by way of wipers 381–382 and the make contact of break-make contacts 396 to the telephone substation 100.

When the guest at the telephone substation 100 completes the telephone call and replaces the handset in the cradle, the audio service means 501 is automatically re-connected to the telephone handset in the manner previously described. It may therefore be observed that incoming telephone calls as well as outgoing telephone calls are granted priority over the special audio services. In addition, on completion of both the incoming and outgoing telephone calls the telephone subset is automatically re-connected to the previously selected audio service.

While the invention is disclosed as it is embodied in a hotel special service concentrator system it will be obvious to those skilled in the art that the invention could also be used for the control of other special services. For example, the principles of the invention could advantageously be applied to a selective paging system where the microphone is located some distance from the paging amplifier. That is, the telephone subset could be replaced with a microphone and the audio services and the line circuits with loudspeakers placed at various locations within an area. An operator at the microphone, or transmitting station, may then selectively page at any of the locations by simply setting the selector switch to cause the rotary switch to step to select any one of the loudspeakers, in the manner previously described. In addition, the invention could be used in an office intercommunication system. These and other various departures from the details of the illustrative embodiment shown will suggest themselves to those skilled in the art.

What is claimed is:

1. A special service concentrator system including: a telephone substation; a telephone subset at said substation; a control line; selector means at said substation having a plurality of resistances connected thereto, said resistances selectively connectable to one end of said control line by means of said switch; a service adapter comprising a rotary switch including a plurality of levels of bank contacts, moveable mounted wipers on each of said levels for selectively engaging one of said bank contacts and stepping means for stepping said wipers, and condition responsive means connected to the other end of said control line and to said stepping means; a line circuit connected to one of said bank contacts on at least one of said levels; a plurality of audio service means, each associated with at least one of said resistances and each connected to a different one of said bank contacts on at least said last-mentioned level; and a transmission line for transmitting voice frequency signals connected between said telephone subset and said wipers on said levels having said line circuit and said plurality of audio service means connected thereto, said transmission line normally connected by said wipers to said bank contacts associated with said line circuit; said condition responsive means operated in response to the operation of said selector means for causing said stepping means to operate and step said wipers to disconnect said transmission line from said bank contacts associated with said line circuit and to connect said transmission line to the bank contacts associated with said audio service means corresponding to the resistance connected to said control line by said selector means.

2. A special service concentrator system as claimed in claim 1, wherein said condition responsive means comprises a plurality of resistance corresponding to said resistances connected to said selector means at said substation, a first and a second fixed resistance, said plurality of resistances connected to said selector means and in said condition responsive means and said first and second fixed resistances comprise the two variable arms, respectively, and the two fixed arms, respectively of a resistance bridge.

3. A special service concentrator system as claimed in claim 2, wherein said condition responsive means further comprises an interrupter circuit for said stepping means, a transistor amplifier for powering said interrupter circuit, and rectifier means having its input connection connected to the output diagonal of said resistance bridge and its output connection to the input of said transistor amplifier.

4. A special service concentrator system as claimed in claim 2, wherein said plurality of resistances in said condition responsive means are connected to the bank contacts on one of said levels of said rotary switch and are selectively connectable to said control line by said rotary switch.

References Cited in the file of this patent

UNITED STATES PATENTS

| | | |
|---|---|---|
| 1,695,176 | Clement | Dec. 11, 1928 |
| 1,974,062 | Vriendt | Sept. 18, 1934 |
| 1,981,689 | Deakin et al. | Nov. 20, 1934 |
| 2,031,075 | Scheibell | Feb. 18, 1936 |